Figure 1:
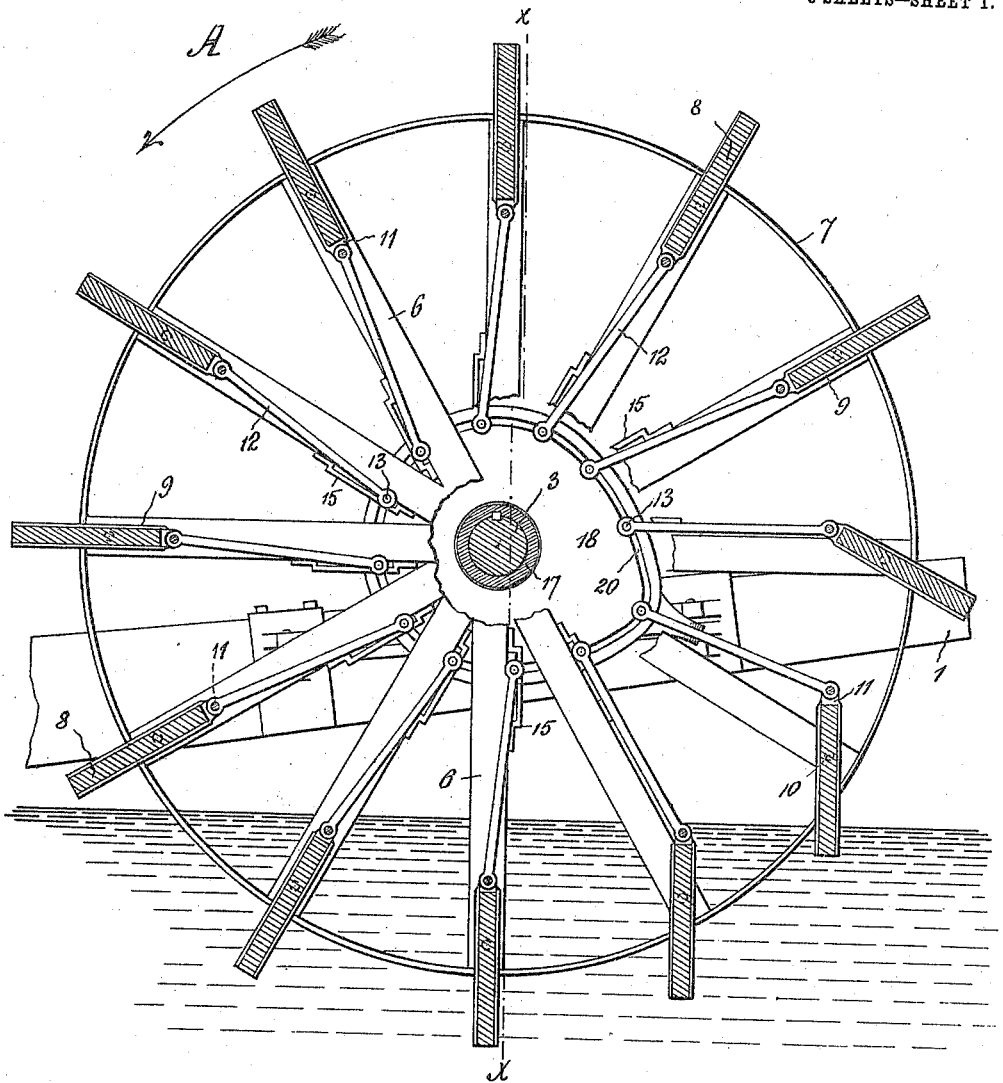

C. T. WOODBURN.
PROPELLER WHEEL.
APPLICATION FILED NOV. 21, 1908.

950,981.

Patented Mar. 1, 1910.
3 SHEETS—SHEET 1.

Witnesses
A. H. Rabsay,
K. H. Butler

Inventor
C. T. Woodburn,
By H. C. Evert & Co.
Attorneys

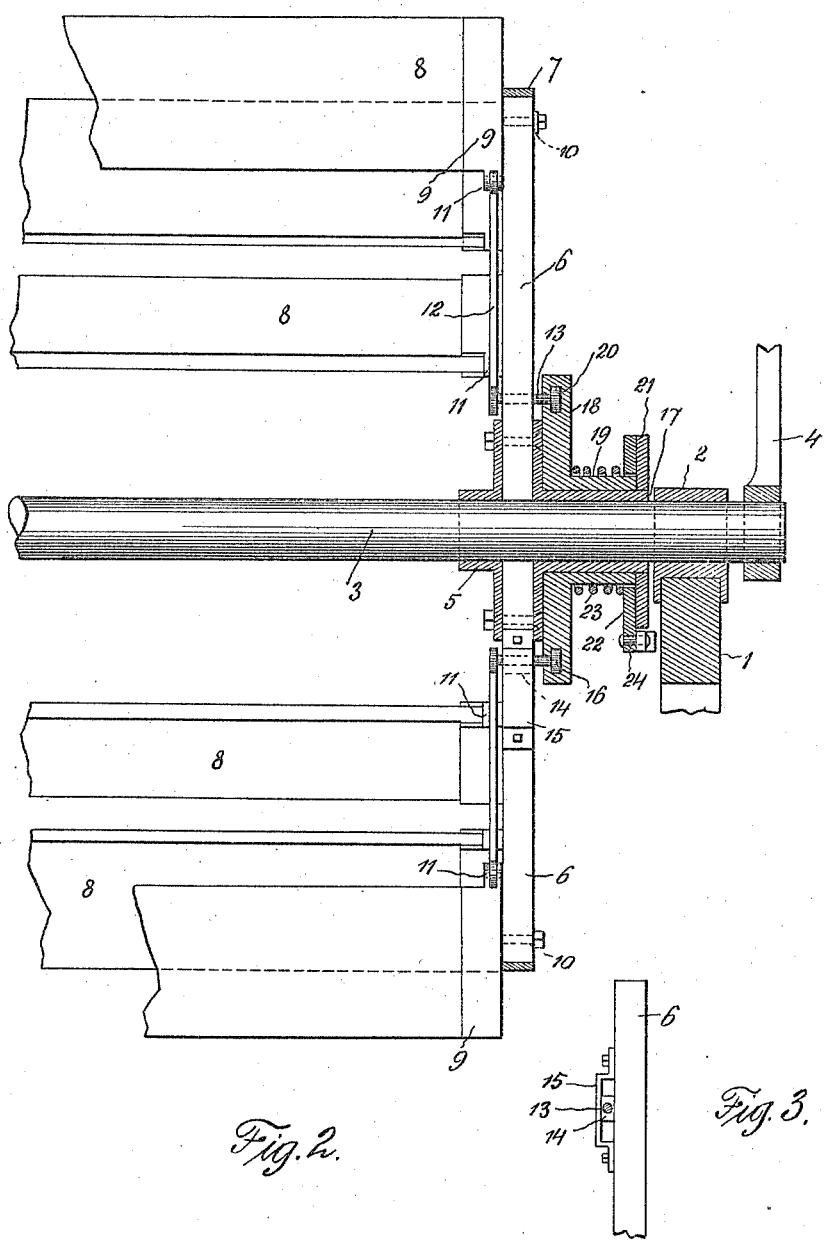

C. T. WOODBURN.
PROPELLER WHEEL.
APPLICATION FILED NOV. 21, 1908.

950,981.

Patented Mar. 1, 1910.
3 SHEETS—SHEET 3.

Witnesses
A. H. Rabsag
N. N. Butler

Inventor
C. T. Woodburn
By H. C. Evart & Co.
Attorneys

UNITED STATES PATENT OFFICE.

CHARLES T. WOODBURN, OF MUNHALL, PENNSYLVANIA.

PROPELLER-WHEEL.

950,981.          Specification of Letters Patent.     Patented Mar. 1, 1910.

Application filed November 21, 1908. Serial No. 463,851.

*To all whom it may concern:*

Be it known that I, CHARLES T. WOODBURN, a citizen of the United States of America, residing at Munhall, in the county of Allegheny and State of Pennsylvania, have invented certain new and useful Improvements in Propeller-Wheels, of which the following is a specification, reference being had therein to the accompanying drawing.

This invention relates to propeller wheels, and more particularly to that type of wheel styled "paddle-wheel," and generally used at the sides or stern of a boat or vessel, for propelling the same.

The primary object of my invention is to provide a paddle wheel in which the paddles have an axial movement independent of the axis of a wheel in order to regulate and determine their direction of entrance and exit from the water.

Another object of my invention is to provide an automatic device for positioning the paddles of a wheel whereby they will offer the least resistance when leaving the water and thereby utilize all the power by which the wheel is operated.

Among the objections occurring in connection with the present type of paddle wheel are that the angles of entrance and exit of the paddles to the water are such that said paddles are subjected, while in the water, to varying velocities and to the weight of water to such a degree as to limit their effectiveness and subject them to strains tending to injure the paddles, besides retarding the movement of the wheel. Considerable power is lost by the present type of paddle wheel "breaking water" or lifting vast volumes of water from the current, and to overcome these objections I have devised my automatic device by which the paddles of a wheel can be correctly positioned in accordance with the rotative movement of the wheel for entering and leaving the water at such angles as to utilize all the power employed for controlling the wheel.

Further, my invention aims to provide an automatic reversing device for correctly positioning the blades or paddles of a wheel when the movement of the latter is reversed.

A still further object of the invention is to so trunnion the blades or paddles of a wheel whereby a greater pressure of water will affect the lower half of the paddles, causing the paddles or blades to assume a vertical position which is regulated or controlled by my device.

Still further, my invention aims to relieve a wheel of stresses and strains by loosely mounting the paddles or blades thereon, between the radiating spokes of the wheel and controlling the position or inclination of the blades or paddles, from a device loosely mounted upon the axle of the wheel.

With the above and other objects in view which will more readily appear as the invention is better understood, the same consists in the novel construction, combination and arrangement of parts to be presently described and then claimed.

Figure 4:
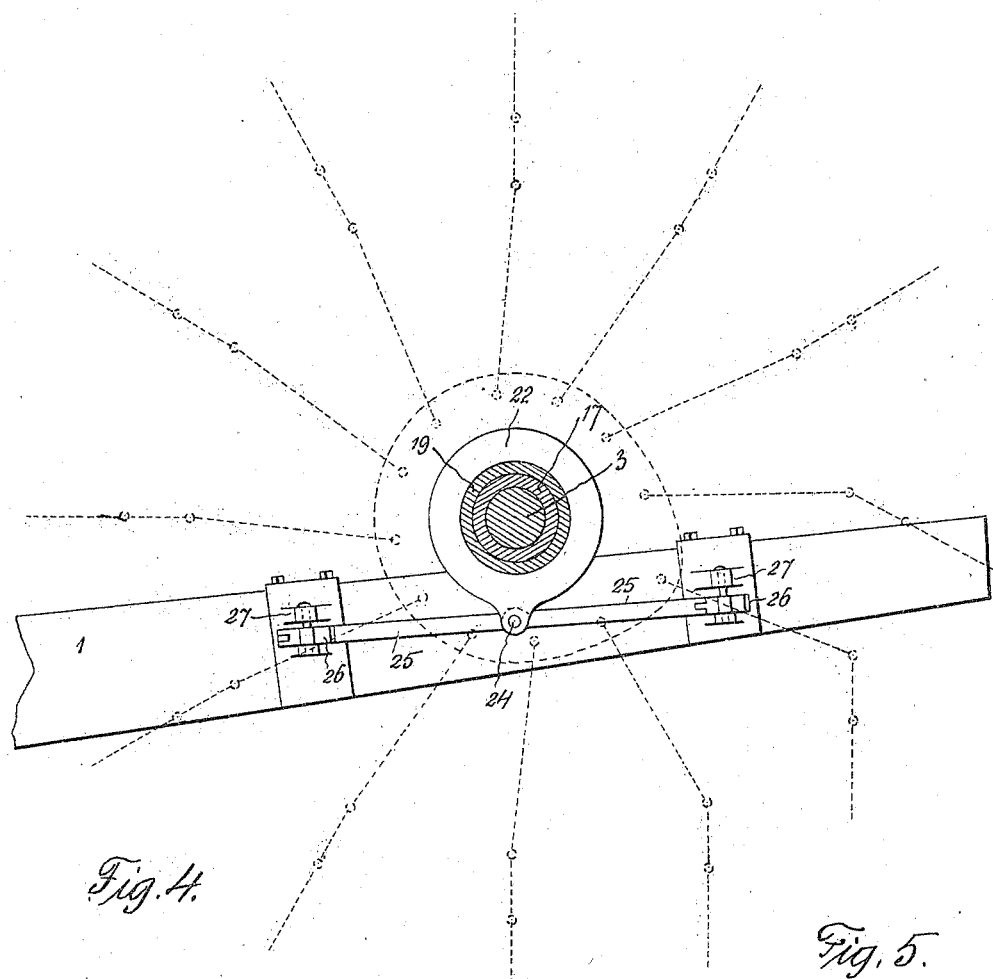
Figure 5:
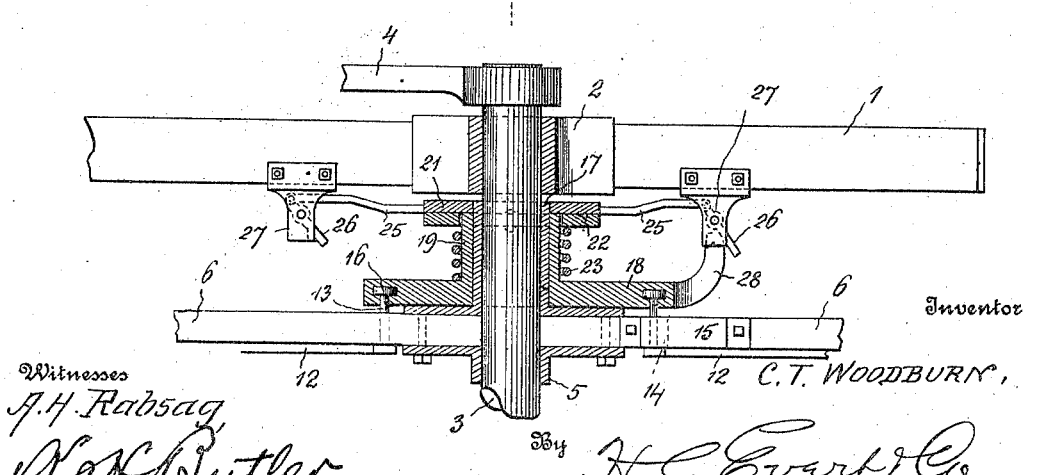

In the drawings, Figure 1 is a vertical cross sectional view of a wheel constructed in accordance with my invention, Fig. 2 is a vertical longitudinal sectional view of the same taken on the line X—X of Fig. 1, Fig. 3 is a detail of one of the guides carried by the spokes of the wheel, Fig. 4 is a cross sectional view of a portion of the wheel illustrating the reversing latches, and Fig. 5 is a horizontal sectional view of a portion of the wheel illustrating the latches in plan.

In the accompanying drawings, 1 designates the rearwardly projecting beams of a stern wheel driven boat or vessel, and upon these beams are located bearings 2 for a transverse axle or shaft 3 having the ends thereof provided with cranks 4, whereby the axle or shaft can be driven by an engine or suitable source of power located upon the boat. Keyed or suitably fixed to the axle or shaft 3 are hubs 5 for supporting a plurality of radiating spokes 6 having the outer ends thereof connected by rings or bands 7. Trunnioned between the spokes adjacent the outer ends of the latter are transverse blades or paddles 8, having the ends thereof fixed in holders 9 which are pivotally connected or trunnioned to the spokes 6, as at 10. These paddles or blades are trunnioned off center or nearer the inner edges than the outer edges, whereby said blades or paddles will present a larger area below the axial line of the blades, when said blades are in the water, consequently the pressure of water will have a tendency to force the blades to a vertical position and thereby assist the automatic device hereinafter described in correctly positioning the blades to leave the water.

The inner ends of the holders 9 are provided with apertured lugs 11 and pivotally connected to said lugs are links 12. Journaled in the inner ends of said links are wrist pins 13 loosely carried by blocks 14 slidably mounted in guides 15, carried by the spokes 6. The outer ends of the wrist pins 13 are provided with circular heads 16, preferably loose on the wrist pins to reduce friction.

The hubs 5 of the wheel are provided with extensions or sleeves 17 and loosely mounted upon said extensions or sleeves are cams 18 having sleeves 19 surrounding the extensions 17 and extending in proximity to the outer ends of said extensions. The faces of the cams 18 confronting the spokes 6 are provided with cam grooves 20 T-shaped in cross section to receive the wrist pins 13 and the heads 16 carried thereby. Fixed upon the extensions 17 at the outer ends thereof are disks 21 and adapted to engage said disks are clutch disks 22 loosely mounted upon the sleeves 19 of the cams 18. Encircling the sleeves 19 between the cams 18 and the clutch disks 22 are coil springs 23 which tend to press the clutch disks 22 against the disks 21. Pivotally connected to the clutch disks 22, as at 24, are latch levers 25, the outer ends of said levers being pivotally connected to latches 26 which are pivotally mounted in brackets 27 carried by the beams 1. Each cam 18 is provided with an arm 28 adapted to be engaged by the latches 26 and the brackets 27 for limiting the movement of the cams 18. The brackets 27 and the latches 26 are arranged at the sides of the main bearings 2 and are adapted to limit the movement of the cams 18 and through the medium of said cams control the adjustment and inclination of the blades 8.

In operation, the propeller wheel illustrated in Fig. 1 is adapted to revolve in the direction of the arrow A. With the cam 18 in the position shown in Fig. 1 of the drawings, the blades 8 are maintained in a position radially of the hub when entering the water and until they arrive at a position immediately below the axle 2, where they are in a vertical position, after which the action of the cam is such as to maintain them in a vertical position until they have left the water. After the blades leave the water, they gradually assume a radial position or in direct alinement with the spokes for again entering the water in the manner described. Should the rotative movement of the wheel be reversed, the clutch disks 22 which have remained stationary during the rotation of the disks 21, rotate with said disks until such time as the arm 28 engages the opposite bracket 27, thus shifting the position of the cams 18, whereby the entrance and exit of the blades 8 will be the reverse of that shown in Fig. 1.

The latches 26 are adapted to hold the arm 28 in engagement with said brackets, and prevent the cam 18 from shifting, except with the rotative movement of the wheel reversed. The latches 26 it is to be noted are pivotally hung in the brackets 27, so that when the direction of movement of the wheel is reversed, the cams 18 may move with the axle to the limit of movement permitted by the latch levers 26.

It is apparent from the foregoing description, that I have devised positive and reliable means for adjusting the inclination of blades pivotally supported by a wheel, the adjustment of said blades being such as to increase the efficiency of a wheel as a propelling medium.

While in the drawings forming a part of this application, there is illustrated the preferred embodiments of my invention, I would have it understood that the details of construction can be varied or changed as to the shape, proportion and manner of assemblage without departing from the spirit of the invention.

Having now described my invention what I claim as new, is:—

1. In a propeller wheel, the combination with supporting beams, an axle journaled in bearings on said supporting beams, hubs carried by said axle, and a plurality of spokes carried by said hubs, of transverse blades trunnioned between said spokes, links pivotally connected at one end to said blades, wrist pins carried by said links at the free ends thereof, cams loosely mounted upon said hubs and having cam grooves formed therein to receive said wrist pins, a disk mounted stationary upon each hub, a clutch disk loosely supported by each hub, latch levers pivotally connected to the clutch disks, brackets carried by said supporting beams, latches pivotally mounted in said brackets and having the outer ends of said latch levers pivotally connected thereto, projecting arms carried by said cams to engage with said brackets, and means interposed between said cams and said clutch disks for frictionally engaging the latter with the stationary disks.

2. In a propeller wheel, the combination with supporting beams, an axle journaled in bearings upon said supporting beams, hubs carried by said axle, and a plurality of spokes carried by said hubs, of blades trunnioned between said spokes, links pivotally connected at one end to said blades, wrist pins carried by the free ends of said links, cams loosely mounted upon said hubs and having cam grooves formed therein to receive said wrist pins, a stationary disk mounted upon said hubs, clutch disks loosely supported by said hubs, means for maintaining the clutch disks in frictional engagement with said stationary disks, latch levers pivotally connected to said clutch disks, stop brackets carried by said supporting beams, latches carried by said stop brackets and pivotally connected to the outer ends of said latch levers, and means carried by said cams to engage said stop brackets for limiting the movement of said cams.

In testimony whereof I affix my signature in the presence of two witnesses.

CHARLES T. WOODBURN.

Witnesses:
MAX H. SROLOVITZ,
C. V. BROOKS.